United States Patent
Wingert

(10) Patent No.: US 6,516,586 B1
(45) Date of Patent: *Feb. 11, 2003

(54) APPARATUS AND METHOD FOR BAGGING AGRICULTURAL FEED

(76) Inventor: Paul R. Wingert, R.R. 1, Box 192, Plainview, MN (US) 55964

( * ) Notice: Subject to any disclaimer, the term of this patent is extended or adjusted under 35 U.S.C. 154(b) by 0 days.

This patent is subject to a terminal disclaimer.

(21) Appl. No.: 09/571,424

(22) Filed: May 15, 2000

Related U.S. Application Data

(62) Division of application No. 09/175,821, filed on Oct. 20, 1998, now Pat. No. 6,061,999, which is a continuation of application No. 08/904,160, filed on Jul. 31, 1997, now Pat. No. 5,878,552.

(51) Int. Cl.[7] .................... B65B 1/24; B65B 13/20; B65B 63/02
(52) U.S. Cl. .................... 53/438; 53/459; 53/473; 53/570
(58) Field of Search .................... 53/428, 438, 459, 53/473, 567, 570, 576; 100/100, 177; 141/114, 10, 71

(56) References Cited

U.S. PATENT DOCUMENTS

| | | | |
|---|---|---|---|
| 3,783,578 A | * | 1/1974 | Willis et al. |
| 4,046,068 A | | 9/1977 | Eggenmuller et al. ........ 100/65 |
| 4,072,273 A | | 2/1978 | Reiniger ..................... 241/24 |
| 4,100,023 A | | 7/1978 | McDonald ................... 195/27 |
| 4,241,562 A | * | 12/1980 | Meyer |
| 4,310,036 A | | 1/1982 | Rasmussen et al. ........ 141/114 |
| 4,502,378 A | | 3/1985 | Cullen ......................... 100/65 |
| 4,611,642 A | | 9/1986 | Durhman .................... 141/114 |
| 4,621,666 A | * | 11/1986 | Ryan |
| 4,672,794 A | | 6/1987 | Good .......................... 53/440 |
| 4,686,817 A | * | 8/1987 | Brodrecht et al. |
| 4,688,480 A | * | 8/1987 | Ryan |
| 4,721,503 A | | 1/1988 | Rasmussen et al. ........ 493/413 |
| 4,724,876 A | | 2/1988 | Ryan .......................... 141/114 |
| 4,867,736 A | | 9/1989 | Rasmussen et al. ........ 493/413 |
| 4,899,967 A | | 2/1990 | Ryan .......................... 198/513 |
| 4,907,503 A | | 3/1990 | Ryan .......................... 100/65 |
| 4,949,633 A | | 8/1990 | Johnson et al. ............... 100/65 |
| 5,140,802 A | | 8/1992 | Inman et al. ................. 53/459 |
| 5,178,061 A | | 1/1993 | Alonso-Amelot ............ 100/65 |
| 5,213,143 A | | 5/1993 | Policky et al. ................ 141/71 |

(List continued on next page.)

*Primary Examiner*—Eugene Kim
(74) *Attorney, Agent, or Firm*—Schwegman, Lundberg, Woessner & Kluth, P.A.

(57) ABSTRACT

An improved agricultural feed bagging machine for loading feedstock into expandable storage bags. The bagging machine has a double-tapered tunnel for deploying a folded bag, stretching the bag and then releasing the stretched bag about feed that is simultaneously being compacted and extruded within the tunnel towards and out an open end of the tunnel. The machine also includes a hopper disposed adjacent the tunnel forward end and communicating with the tunnel through a feed opening oriented in a wall defining the forward end of the tunnel. The machine also includes a rotor element for propelling feed stock from the hopper though the feed opening into the tunnel and a secured bag, the rotor element having a rotor rotatable about a horizontal axis. The present invention also provides an improved method for loading agricultural feed stock into a horizontally deployed bag including the steps of: mounting the bag in a folded condition around a forward end of a tunnel; deploying the bag from the forward end of the tunnel towards a rearward end of the tunnel; stretching the bag circumferentially with the tunnel between the forward and rearward ends, and then reducing in circumference the bag; compacting feed, from the tunnel forward end, into the tunnel between the forward and rearward ends, and then reducing in circumference the feed as the feed passes towards the rearward end of the tunnel; and allowing the feed to extrude from the rearward end of the tunnel into the bag.

20 Claims, 14 Drawing Sheets

U.S. PATENT DOCUMENTS

| | | | |
|---|---|---|---|
| 5,220,772 A | 6/1993 | Koskela et al. | 53/576 |
| 5,295,554 A | 3/1994 | Cullen | 180/236 |
| 5,297,377 A | 3/1994 | Cullen | 53/527 |
| 5,313,768 A | 5/1994 | Cullen | 53/570 |
| 5,345,744 A | 9/1994 | Cullen | 53/128.1 |
| 5,355,659 A | 10/1994 | Cullen | 53/567 |
| 5,367,860 A | 11/1994 | Cullen | 53/576 |
| 5,396,753 A * | 3/1995 | Cullen | |
| 5,398,736 A | 3/1995 | Cullen | 141/114 |
| 5,408,809 A | 4/1995 | Cullen | 53/567 |
| 5,408,810 A | 4/1995 | Cullen | 53/567 |
| 5,413,155 A | 5/1995 | Ryan | 141/114 |
| 5,419,102 A | 5/1995 | Inman et al. | 53/567 |
| 5,421,142 A | 6/1995 | Cullen | 53/567 |
| 5,425,220 A | 6/1995 | Cullen | 53/527 |
| 5,426,910 A | 6/1995 | Cullen | 53/128.1 |
| 5,452,562 A | 9/1995 | Cullen | 53/428 |
| 5,461,843 A | 10/1995 | Garvin et al. | 53/434 |
| 5,463,849 A | 11/1995 | Cullen | 53/527 |
| 5,464,049 A | 11/1995 | Cullen | 141/114 |
| 5,469,693 A * | 11/1995 | Brodrecht | |
| 5,517,806 A | 5/1996 | Cullen | 53/527 |
| 5,566,532 A | 10/1996 | Inman et al. | 53/529 |
| 5,570,565 A * | 11/1996 | Simpson | |
| 5,724,793 A | 3/1998 | Inman et al. | 53/576 |
| 5,878,552 A * | 3/1999 | Wingert | |
| 6,061,999 A * | 5/2000 | Wingert | |

\* cited by examiner

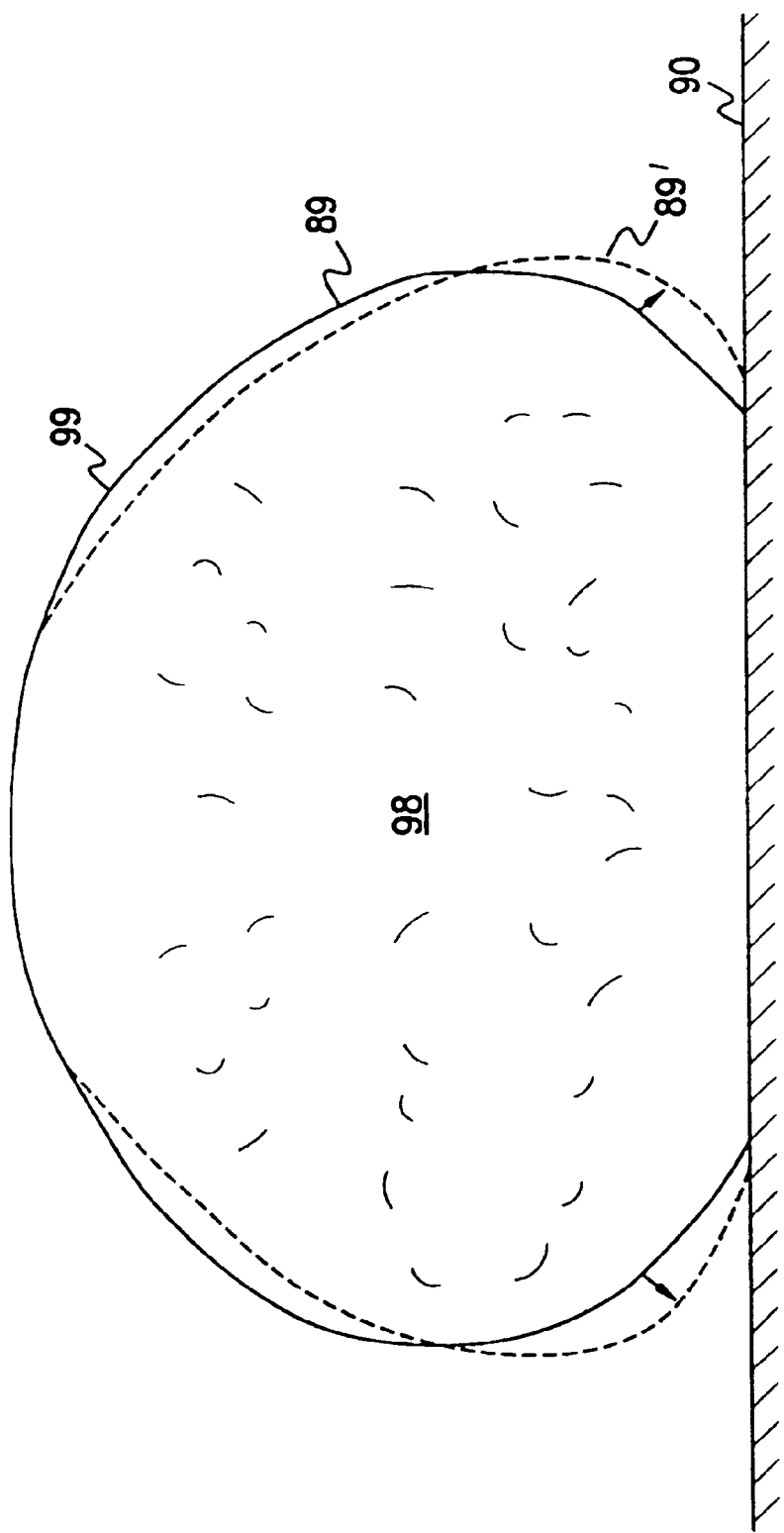

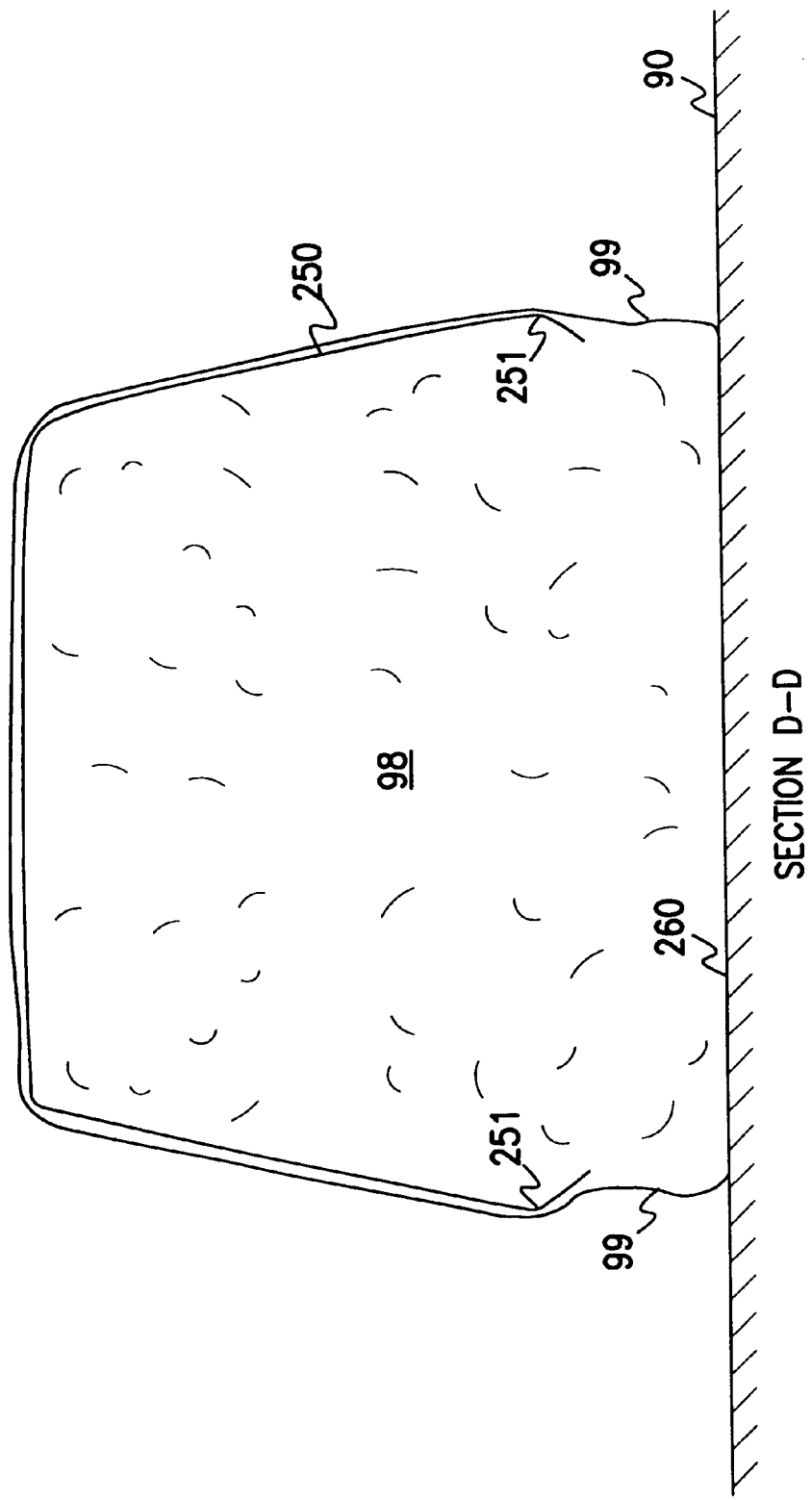

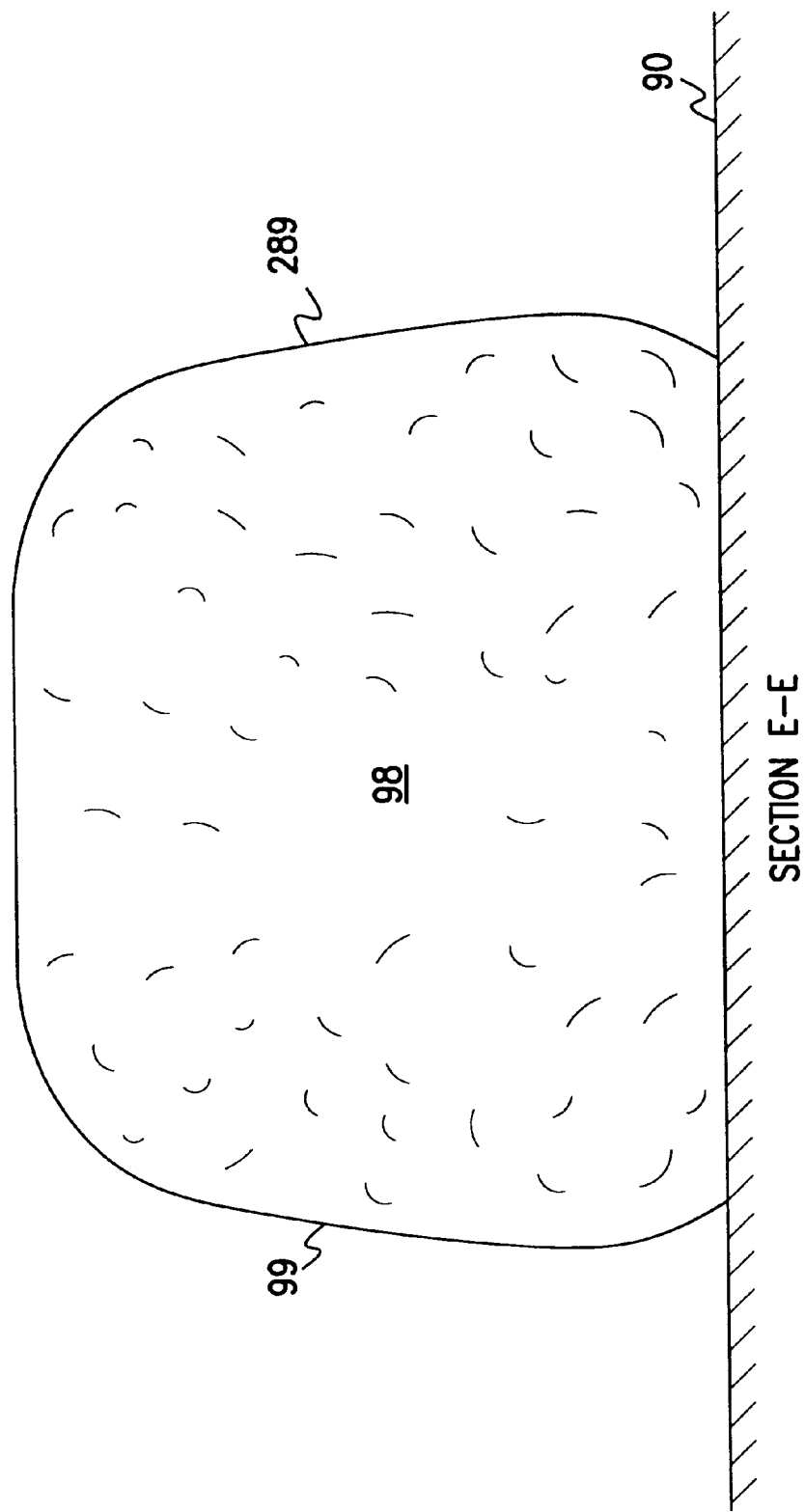

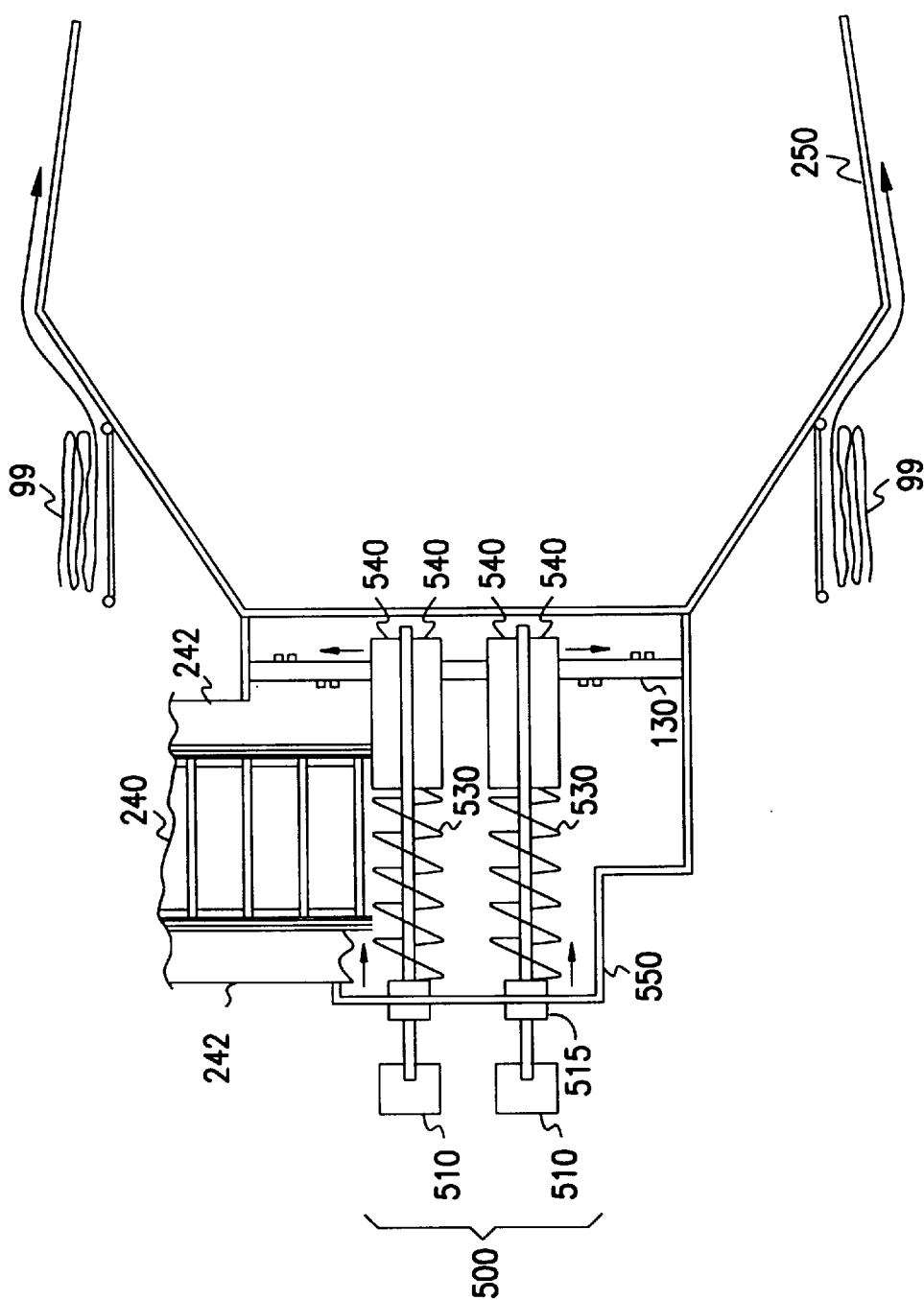

APPARATUS AND METHOD FOR BAGGING AGRICULTURAL FEED

This is a divisional of U.S. application Ser. No. 09/175,821, filed Oct. 20, 1998 now U.S. Pat. No. 6,061,999 which is a continuation of U.S. application Ser. No. 08/904,160, filed Jul. 31, 1997 (now U.S. Pat. No. 5,878,552), which application and patent are incorporated herein by reference.

FIELD OF THE INVENTION

This invention relates to the field of loading compressible, agricultural feed stock into expandable storage bags, and more specifically to an improved method and apparatus of evenly compressing the feed stock to achieve fully filled, smooth bags.

BACKGROUND OF THE INVENTION

Horizontally expandable, silage storage bags are commonly used as an alternative to permanent feed storage structures such as barns and silos. From an economic standpoint, the expandable storage bag is preferable to more elaborate, permanent structure. Further, the expandable bags are more easily loaded than permanent structure and the silage stored therein is readily accessible for use.

An exemplary prior art structure is disclosed in Reissue U.S. Pat. No. 31,810, to Lee. A tractor-powered loading apparatus is disclosed in association with an expandable bag. A backstop is located at the filled end of the bag and has attached thereto laterally spaced cables which extend back to rotatable cable drums. The drums are yieldably braked and, under a predetermined force applied to the cables, release the cable to allow movement of the loading apparatus and tractor away from the filled end of the bag. The bag is filled by a toothed rotor which propels silage through a short tunnel and into the bag inlet. By presetting the braking structure to yield at a desired cable tension, an operator can select the degree of compaction of silage in the bag.

The bag in such bagging machines is manufactured and delivered in a pleated shape, i.e., folded into an accordion-bellows-type shape. Typically, a bag having a nominal ten-foot-diameter (approximately 3 meters diameter, or 9.6 meters circumference) and a 300 foot length (approximately 90 meters length) will be folded to a 10-foot-diameter (about 3 meter) ring about 1 foot (about 0.3 meter) long and 1 foot (about 0.3 meter) thick. To start the loading operation, this bag-ring is pre-loaded around the tunnel, and the pleats are unfolded one at a time as the bag is deployed and filled with feed stock.

In U.S. Pat. No. 4,688,480 issued Aug. 25, 1987 to Ryan, an agricultural feed bagger is described. A brake disk on a shaft associated with spaced cable feeding drums that are yieldably braked controls compacting of the feed and the expansion of the bag. Prior-art FIG. 1A (plan view), 1B (elevation view), 1C (front perspective view, showing bag 99 being filled) and 1D (back view) illustrate one such feed bagging machine 100. Tractor 91 provides power to the feed bagger 100, but does not pull the bagger 100, rather, the pressure from the feed filling the bag pushes the bagger 100 and tractor 91 ahead at a rate equal to the filling of bag 99. A steel cable between bagger 100 and backstop 101 is yieldably held by a disk-brake mechanism 141 that ensures the feed is compacted before the bagger is allowed to advance. A rotor 130 having multiple teeth 131, and powered by a power-take-off (PTO) shaft 133 from tractor 91, forces feed 98 up and back into a short tunnel 150. Movable upper bag bracket 125 is used to lift the folded bag into place on the outside of tunnel 150, and supports/holds the folded bag 99 at the front end of the top of tunnel 150 as it unfolds from the inside. Lower bag tray 120 is substantially horizontal, supported at a fixed level at its front edge by brackets 121, and yieldably supported at its back edge by spring-and-chain 124 (which can have its force adjusted by setting various chain links of the chain onto a fixed hook at the top). Elevator 140, which has a cleated moving belt 141 (e.g., a cleated rubber belt or a chained flight conveyer) moves feed up between two side walls 142 that are substantially vertical at the top of elevator 140. The feed then drops into hopper 139. Such a bagger 100 has a tunnel 150 that provides some support for bag 99 as it unfolds, but which has side walls along which the bag unfolds that are substantially parallel to the direction of travel of the bagger 100. The bagger itself provides negligible back-pressure to the feed which thus presses the bag outward once the feed reaches the bag into a cross section that is circular/oval initially. FIG. 1E is a cross-section view of section 1E—1E from FIG. 1B showing the general oval-like shape 89 of bag 99 after the bag 99 has being filled and passed beyond tunnel 150, (with a flat bottom against the ground, but which collapses more over time (e.g., several days or weeks) to shape 89').

U.S. Pat. No. 5,355,659 describes a tunnel that can be lengthened, for example by a hydraulic cylinder.

U.S. Pat. No. 5,517,806 describes a tunnel that has ridges on the inside vertical surfaces. It also describes cables that cross in the feed path in the bag.

U.S. Pat. No. 5,355,659 describes a tunnel that includes horizontal cables in the feed path in the bag.

There are numerous problems that one contends with using such previous bagging structures. To a large degree, the compliance of the bag itself, combined with the force provided by the teeth pushing feed into the bag against the pressure provided by the compliance of the plastic bag and the braking structure determines the amount of compaction of the feed. That is, to a large extent, the compaction of the feed takes place in the bag itself. As the bag deploys, folds in the bag release unevenly, and the varying pressure of feed against the stretchable plastic bag varies the compaction at various points along the length of the bag, leaving a lumpy bag and often leaves pockets of air. This air allows decomposition or spoilage of the feed in the bag, and a resulting loss of nutritional value remaining for the livestock that eat the feed. In addition, the degree of compaction varies with varying moisture/dryness in the feed, the type of feed (e.g., corn silage vs. hay silage vs. grains, etc.).

What is needed is a apparatus and method for bagging agricultural feed that provides a high amount of even compaction in varying conditions.

SUMMARY OF THE INVENTION

The present invention provides an improved agricultural feed stock loading apparatus that includes a feed tunnel having forward and rearward ends. The tunnel also has a top wall extending between opposite side walls defining a bag opening having a bottom portion extending between the opposite side walls. A folded feed bag with a first end may be placed around the tunnel with the bag first end substantially coinciding with the defined bag opening. The tunnel includes a double taper that, starting at the forward end enlarges and then reduces in circumference.

The machine also includes a hopper disposed adjacent the tunnel forward end and communicating with the tunnel through a feed opening oriented in a wall defining the forward end of the tunnel. The machine also includes a rotor element for propelling feed stock from the hopper though the feed opening into the tunnel and a secured bag, the rotor element having a rotor rotatable about a horizontal axis.

The present invention also provides an improved method for loading agricultural feed stock into a horizontally deployed bag including the steps of: mounting the bag in a folded condition around a forward end of a tunnel; deploying the bag from the forward end of the tunnel towards a rearward end of the tunnel; stretching the bag circumferentially with the tunnel between the forward and rearward ends, and then reducing in circumference the bag; compacting feed, from the tunnel forward end, into the tunnel between the forward and rearward ends, and then reducing in circumference the feed as the feed passes towards the rearward end of the tunnel; and allowing the feed to extrude from the rearward end of the tunnel into the bag.

BRIEF DESCRIPTION OF THE DRAWINGS

FIG. 1E is a cross-section view of section 1E—1E from FIG. 1B showing the general shape of bag 99 after the bag 99 has being filled and passed beyond tunnel 150, wherein the bag 99 has an oval-like shape.

FIG. 2D is a cross-section view of section D—D from FIG. 2B showing the general shape of tunnel 250 and bag 99 where the bag 99 is being filled in tunnel 250.

FIG. 2E is a cross-section view of section E—E from FIG. 2B showing the general shape 289 of bag 99 after the bag 99 has being filled and passed beyond tunnel 250.

FIG. 6 is a plan view of a machine 200 showing the extended hopper box 550 and two counter-rotating flapper assemblies 500.

FIGS. 2A, 2B, and 2C show various embodiments of the present invention having an elongated tapered tunnel 250. FIGS. 2A (plan view of one embodiment of the present invention), 2B (elevation view of one embodiment), 2C (elevation view of another embodiment) illustrate various embodiments of bagger machine 200. Tractor 91 provides power to the feed bagger 200, but does not pull the bagger 200, rather, the pressure from the feed filling the bag pushes the bagger 200 and tractor 91 ahead at a rate equal to the filing of bag 99. In one embodiment, a steel cable between bagger 200 and backstop 201 is yieldably held by a disk-brake mechanism that ensures the feed is compacted before the bagger is allowed to advance. A rotor 130 having multiple teeth 131, and powered by a power-take-off (PTO) shaft 133 from tractor 91, forces feed 98 up and back into tunnel 250. The forward end of tunnel 250, in one embodiment is formed the same as upper front wall 137 and lower front wall 138 of a conventional tunnel 150 (see FIGS. 2B and 5). In one such embodiment, improved tunnel 250 is welded to front edge 199 of a conventional bagger machine 150, after cutting off the straight conventional tunnel portion 150.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 2A:
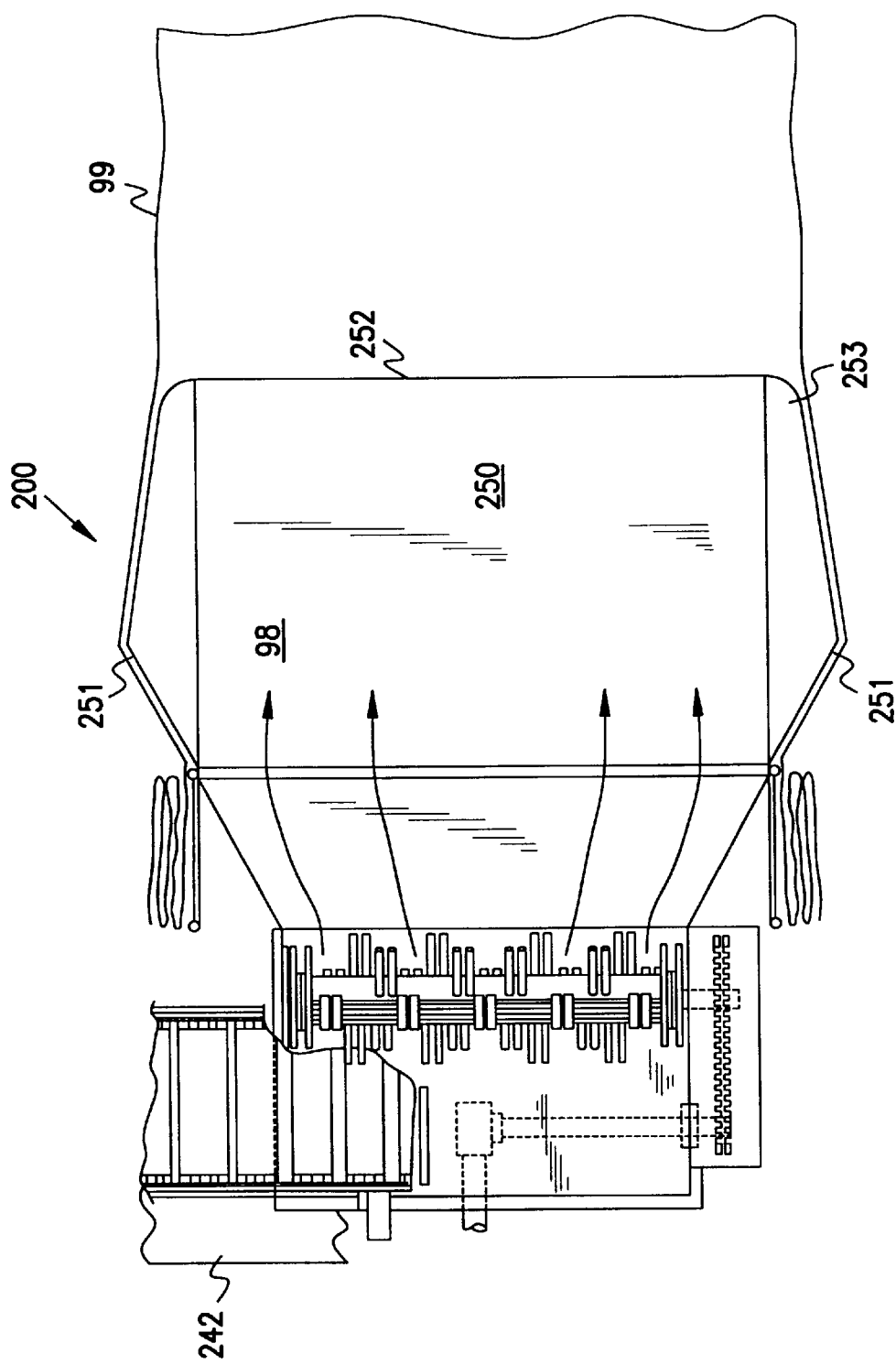
FIG. 2A is a plan view of one embodiment of the present invention 200.
Figure 2B:
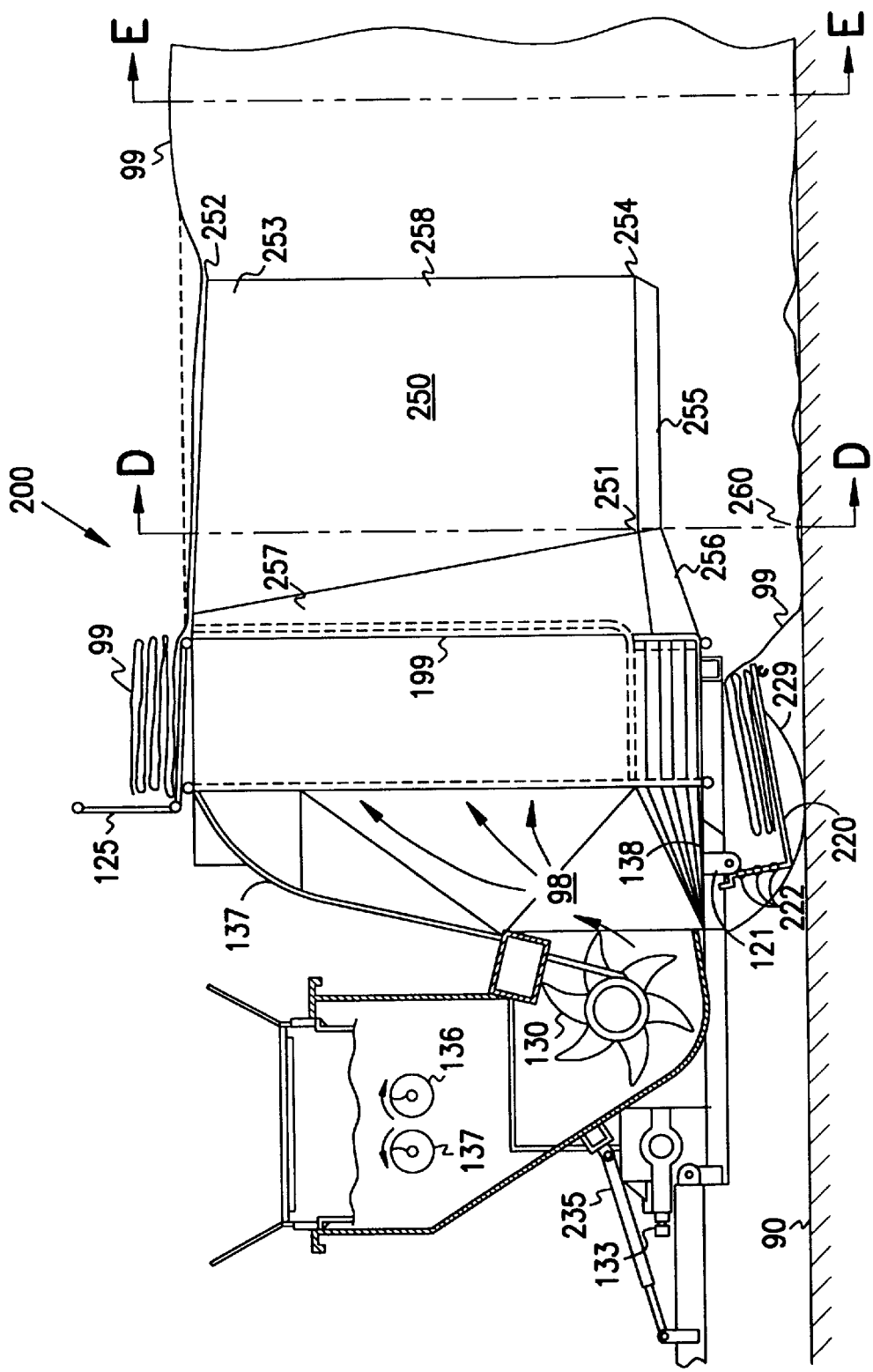
FIG. 2B is an elevation view of one embodiment of the present invention 200.
Figure 2C:
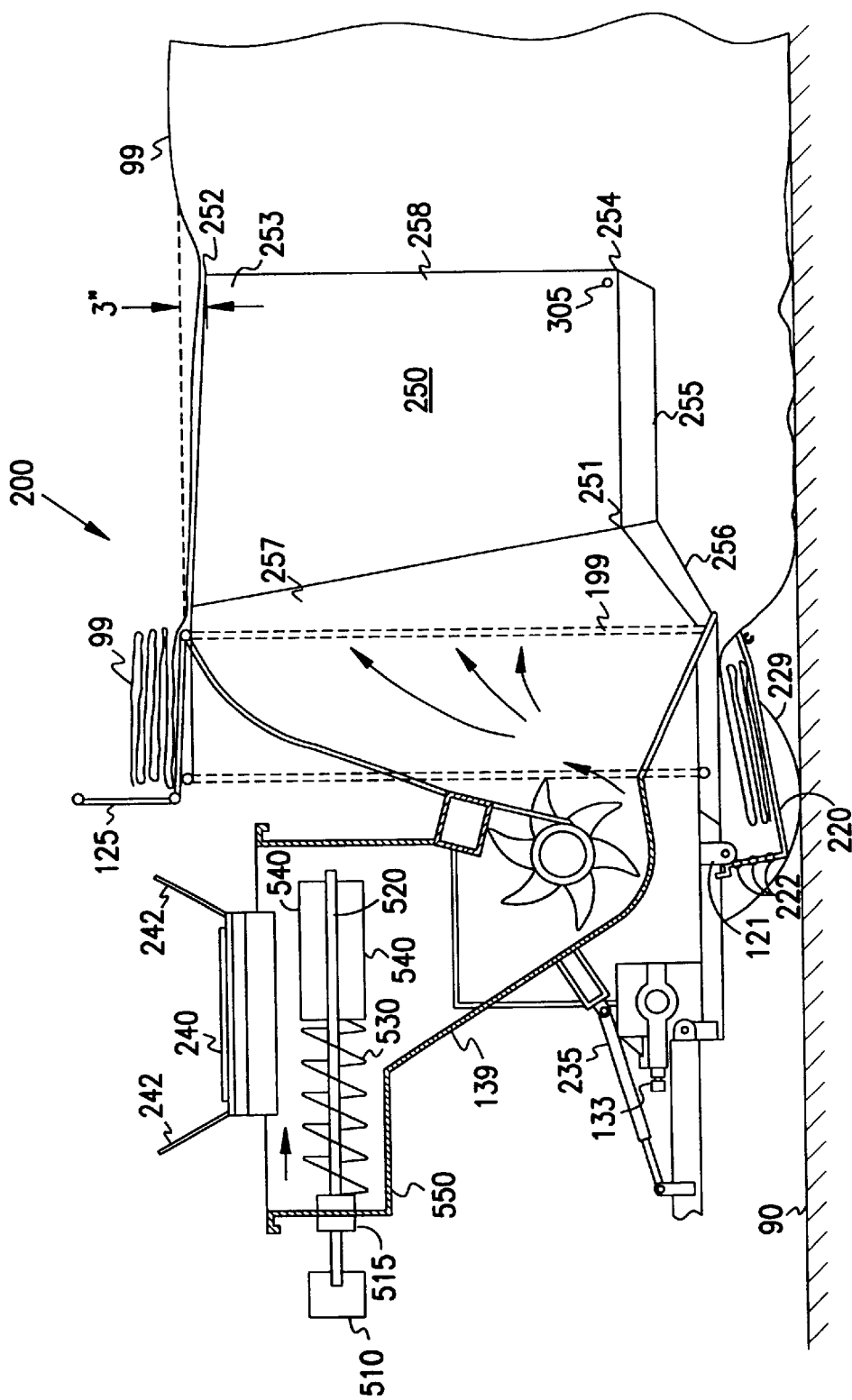
FIG. 2C is an elevation view of another embodiment of the present invention 200.

FIGS. 2A, 2B, and 2C show various embodiments of the present invention having an elongated tapered tunnel 250. FIGS. 2A (plan view of one embodiment of the present invention), 2B (elevation view of one embodiment), 2C (elevation view of another embodiment) illustrate various embodiments of bagger machine 200. Tractor 91 provides power to the feed bagger 200, but does not pull the bagger 200, rather, the pressure from the feed filling the bag pushes the bagger 200 and tractor 91 ahead at a rate equal to the filing of bag 99. In one embodiment, a steel cable between bagger 200 and backstop 201 is yieldable held by a disk-brake mechanism that ensures the feed is compacted before the bagger is allowed to advance. A rotor 130 having multiple teeth 131, and powered by a power-take-off (PTO) shaft 133 from tractor 91, forces feed 98 up and back into tunnel 250. The forward end of tunnel 250, in one embodiment is formed the same as upper front wall 137 and lower front wall 138 of a conventional tunnel 150 (see FIGS. 2B and 5). In one such embodiment, improved tunnel 250 is welded to front edge 199 of a conventional bagger machine 150, after cutting off the straight conventional tunnel portion 150.

Improved tunnel 250 provides several functions to improve and increase the compaction of feed into bag 99, to make the compaction more even, to make the bag 99 smoother (thus reducing included air pockets), to improve the cross-sectional shape of bag 99. The overall idea for improved tunnel 250 is to slightly stretch the bag 99 with the sides and/or top of tunnel 250 before the compacted feed is released into bag 99, to provide a longer tunnel that is tapered inward to compress the feed at the sides and/or top in the tunnel before it is released into bag 99 and also to provide for evening-out of the degree of compaction in the feed (i.e., which occurs within the substantially fixed dimensions of the steel (or other strong metal) sides and top of tunnel 250 rather than in the resilient and expandable sides of bag 99), and to provide a shape to the extruded compacted feed that better retains that shape. In other feed-bagging machines, there is little control over both the degree of compaction versus/along the length of the bag 99, such that bag 99 bulges out in sections of the bag 99 when compaction is too high, and contracts in other sections where compaction is less. With the improved feed bagger 200, the bag 99 is slightly stretched from the circumference at which it releases from top holder 125 and bottom tray 220 as it passes over wide area 251 of tunnel 250, and then gradually is allowed to somewhat contract as it passes to the back end of tunnel 250. In one embodiment, wide area 251 is a point of tapered panels, wherein the point is approximately 9 inches wider than the prior-art straight walls. In another embodiment, rounded walls are used to stretch bag 99, rather than the segmented flat walls shown here. Note that the sides and top of tunnel 250, which hold the two sides (out to the two widest side points 251) and the top of bag 99, and the weight of the feed 98 inside bag 99 at line 260 that fixes the bottom side of bag 99, control the amount of stretching that occurs in bag 99, as well as its ultimate shape. By leaving the bottom of tunnel 250 open, and allowing the compacted feed 98 to determine the shape and position of the filled bag 99, it allows the folded bag 99 to be loaded into the deployment position shown in FIGS. 2A, 2B, or 2C from the back of the tunnel 250 and around the wide areas 251 (i.e., it is much easier to stretch a single layer of bag 99 around the wide portion of tunnel 250 than to stretch one hundred or more folded layers).

The embodiment of FIG. 2C shows elevator 240 moved forward on machine 200 such that angled walls 242 deliver all of the feed into hopper 139. Hopper 139 has also been modified with extension 550, auger 530 which rotates about shaft 520 moving the grain to the rear of the hopper where it is distributed by flappers (paddles) 540. Shaft 520 is driven by, for example, hydraulic motor 510. In one embodiment, two augers 530 are provided, each rotating in opposite directions to distribute the feedstock more evenly.

Figure 5:
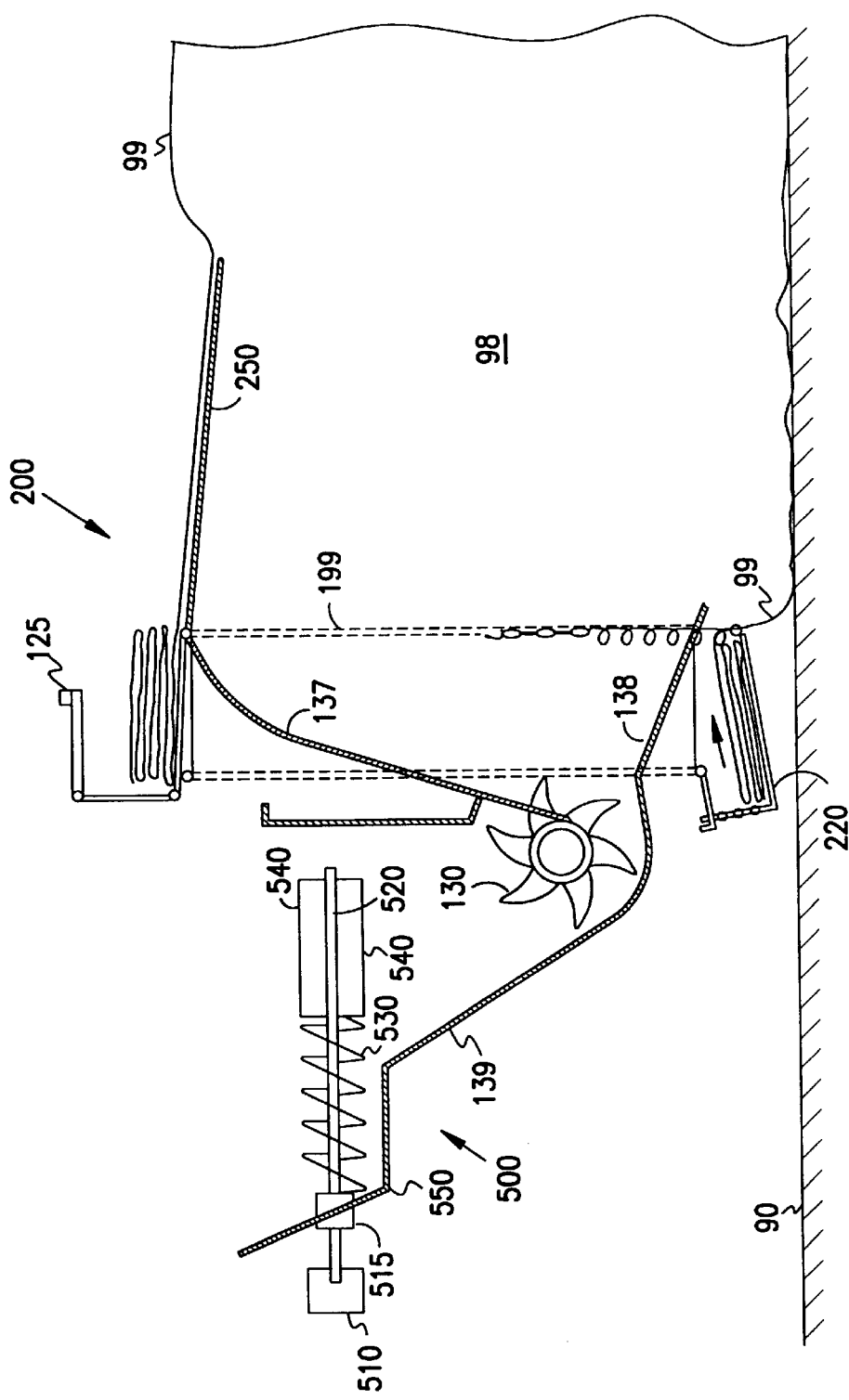
FIG. 5 is an elevation view of yet another embodiment of the present invention 200.

FIG. 5 shows another embodiment of the hopper extension and augers shown in FIG. 2C. As shown in FIG. 5, front tunnel walls 137 and 138 are angled to open into tunnel 250.

FIG. 6 is a plan view of a machine 200 showing the extended hopper box 550 and two counter-rotating flapper assemblies 500. Flappers 540 are spaced apart sufficiently such that some of the incoming feedstock falls between the rotating flapper assemblies to the center of rotor 130 while other feedstock is propelled outward to the ends of rotor 130. This arrangement helps prevent the bridging of feedstock within hopper 139 which otherwise occurs because of the downward and inward taper of the hopper 139, which sometimes wedges the feedstock out of the reach of rotor 130.

Movable upper bag bracket 125 is used to lift the folded bag into place on the outside of tunnel 250, and supports/holds the folded bag 99 at the front end of the top of tunnel 250 as it unfolds from the inside.

Lower bag tray 220 has a slant that is adjustable from horizontal, supported at various user-selectable levels at its front edge by brackets 121, and yieldably supported at its back edge by spring-and-chain 124 (which can have its force adjusted by setting various chain links of the chain onto a fixed hook at the top). This allows the front edge of lower bag tray 220 to be lowered while the front edge is held by spring/chain 124 so that the bag feeds more evenly, and with less likelihood of more than one fold at a time from releasing (once two or more folds release, the weight of the compacted feed on such folds prevents them from ever straightening, thus leaving a lumpy bag and likely included air pockets in the feed in the bag, thus accelerating degradation or spoilage of the feed.

In other elevators 140, one wall 142 is sometimes angled outward (e.g., at about 45 degrees from vertical) at the bottom of the elevator 140 to provide a bigger target area for feed being placed onto the elevator, but then transitions to a vertical orientation before the top of elevator 140. However, the other wall 142 is vertical for the entire length of the elevator. The transition of the first wall from angled to vertical causes grain/feed at that wall to "fold over" the grain that is above the belt 141 (e.g., a cleated rubber belt or a chained flight conveyer) and then roll down on the grain/feed traveling up the elevator 140. This tumbling disrupts the flow of feed, and can cause loss of efficiency since the feed remains tumbling on the elevator 140, and also causes more lost feed to blowing in the wind.

In contrast, elevator 240, which has a cleated moving belt 141 (e.g., a cleated rubber belt or a chained flight conveyer), moves feed up between two side walls 242 that are angled outward for substantially the entire length of elevator 140. In another embodiment, one of the walls 242 is angled outward and the other wall 242 is substantially vertical. The feed, in either embodiment, once it reaches the top of elevator 240 then drops into hopper 239. Because the side walls are angled at the same angle for their entire length, the feed has little tendency to fold over or roll down, thus providing improved efficiency. By angling both side walls 242 outward, a much larger target area is provided for loading feed onto the elevator 240.

Figure 3A:
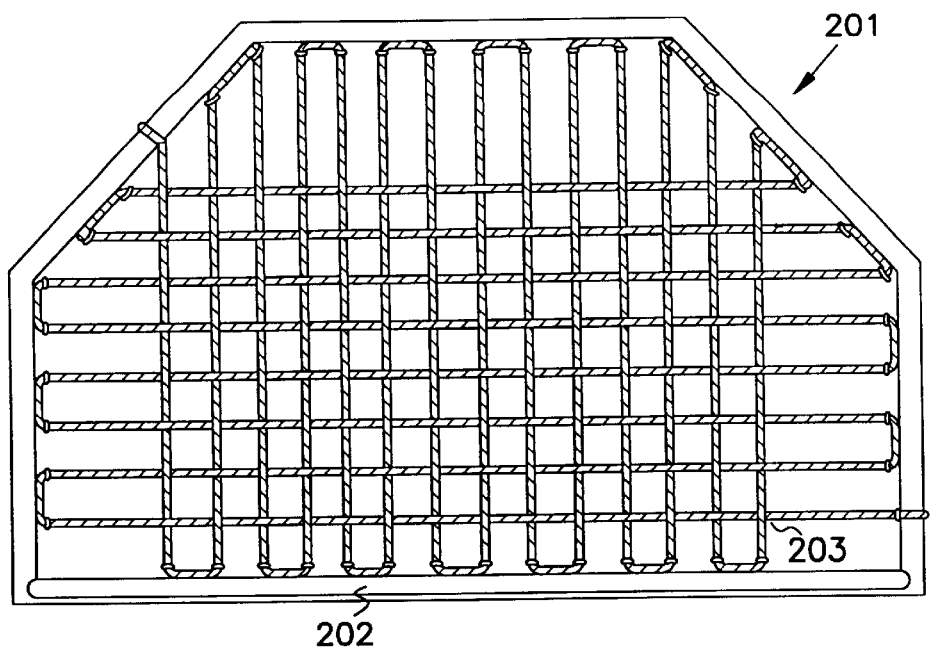
FIG. 3A is a elevation view of one embodiment of improved backstop 201.
Figure 3B:
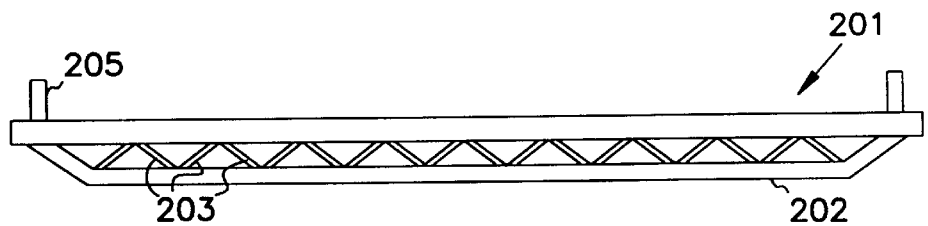
FIG. 3B is a plan view of one embodiment of improved backstop 201.
Figure 3C:
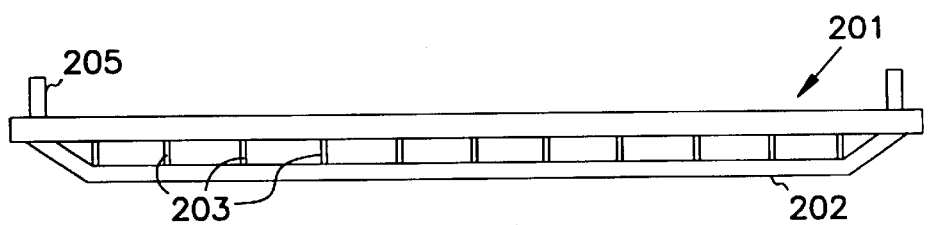
FIG. 3C is a plan view of another embodiment of improved backstop 201.
Figure 4:
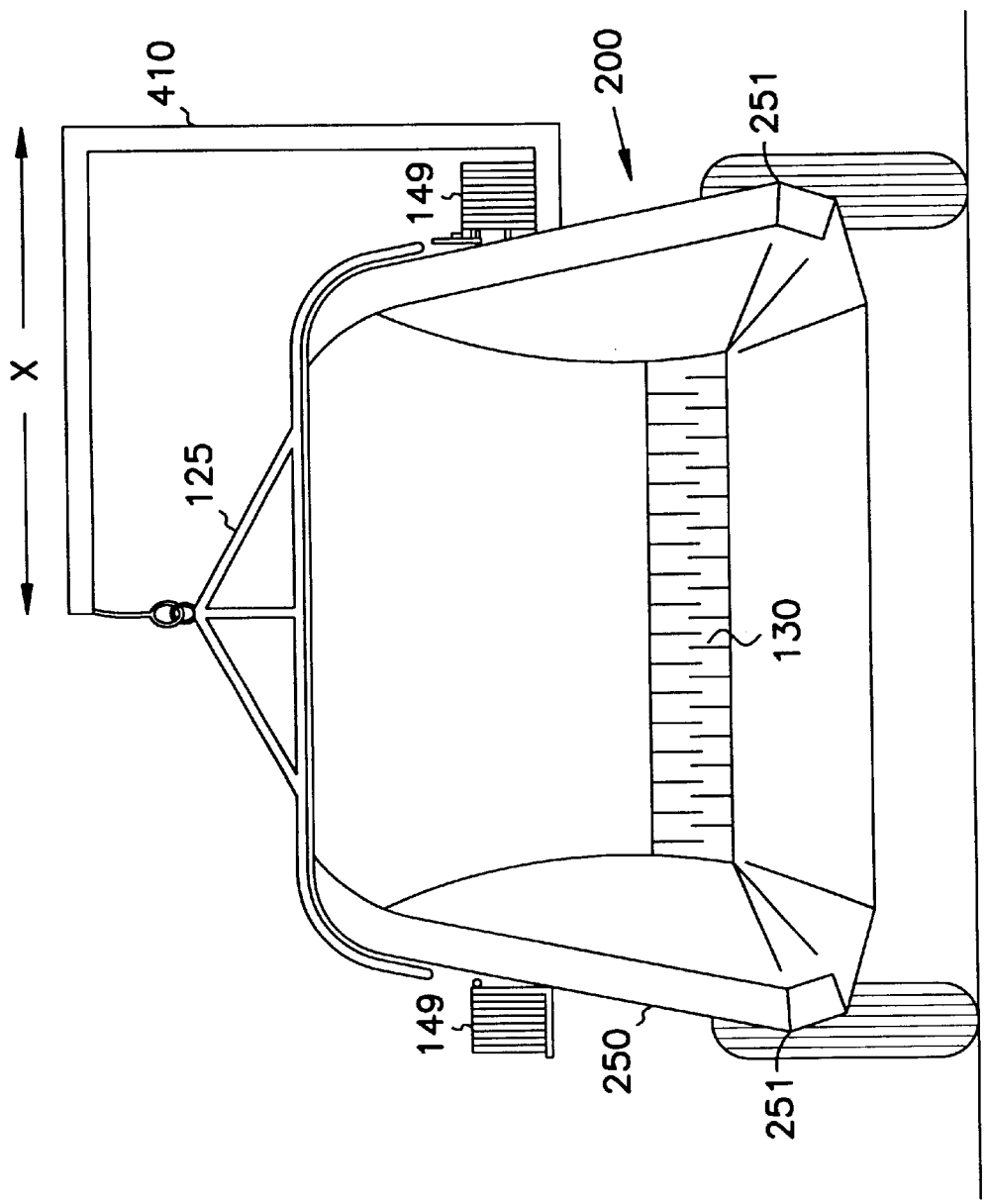
FIG. 4 is a rear elevation view of bagger 200 having an improved lift arm 410 that is wide enough to load a folded bag 99 around widened tunnel 250.

FIG. 3A shows an elevation view of improved backstop 201. Backstop 201 includes a reinforcing bar 202 and crossbar members 203. FIGS. 3B and 3C show plan views of two alternative embodiments of backstop 201 having different configurations of crossbar members 203. Carrying brackets 205 in one embodiment allow the bottom of backstop 201 to be bolted to holes 305 at the rear of tunnel 250, for more secure highway transportation of machine 200.

Problems associated with the operation of the previous bagger 100

Figure 1A:
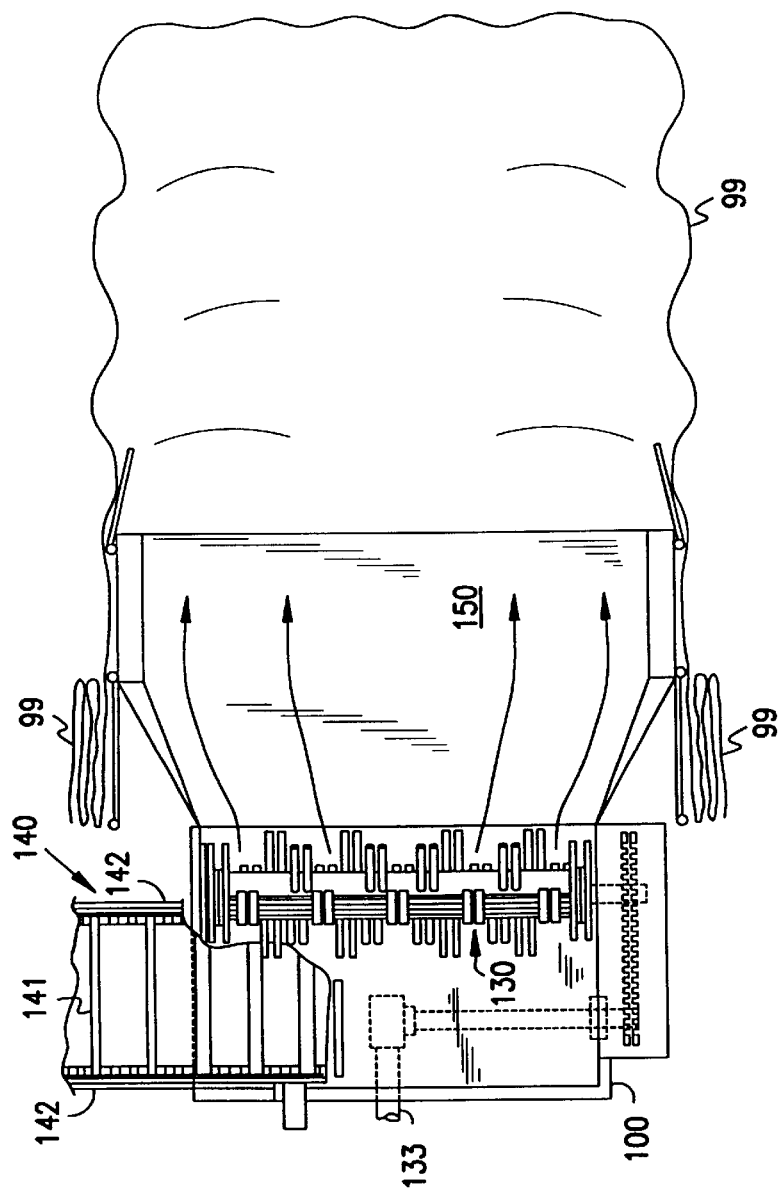
FIG. 1A is a plan view of a prior-art feed-bagging machine 100.
Figure 1B:
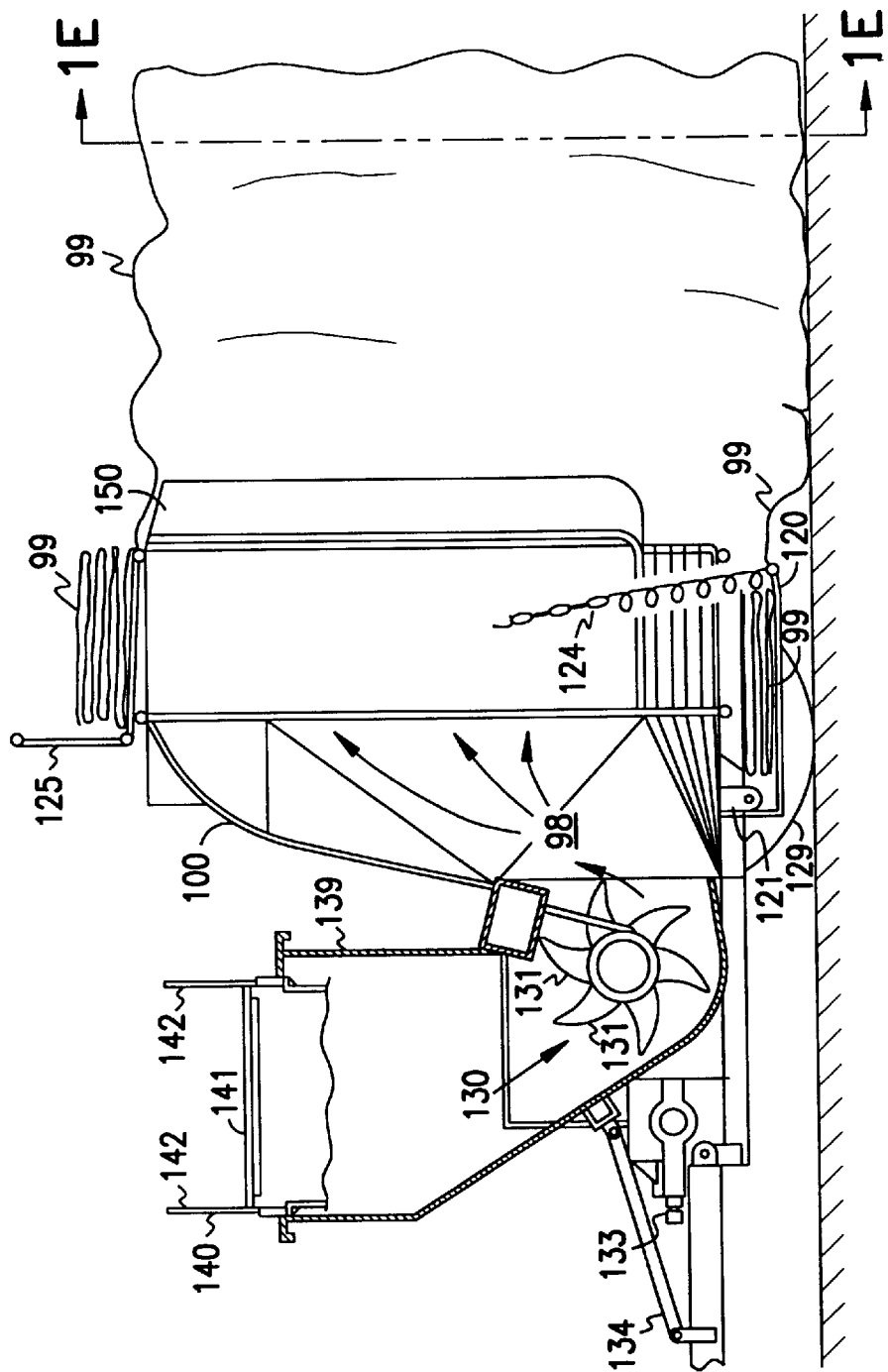
FIG. 1B is an elevation view of a prior-art feed-bagging machine 100.
Figure 1C:
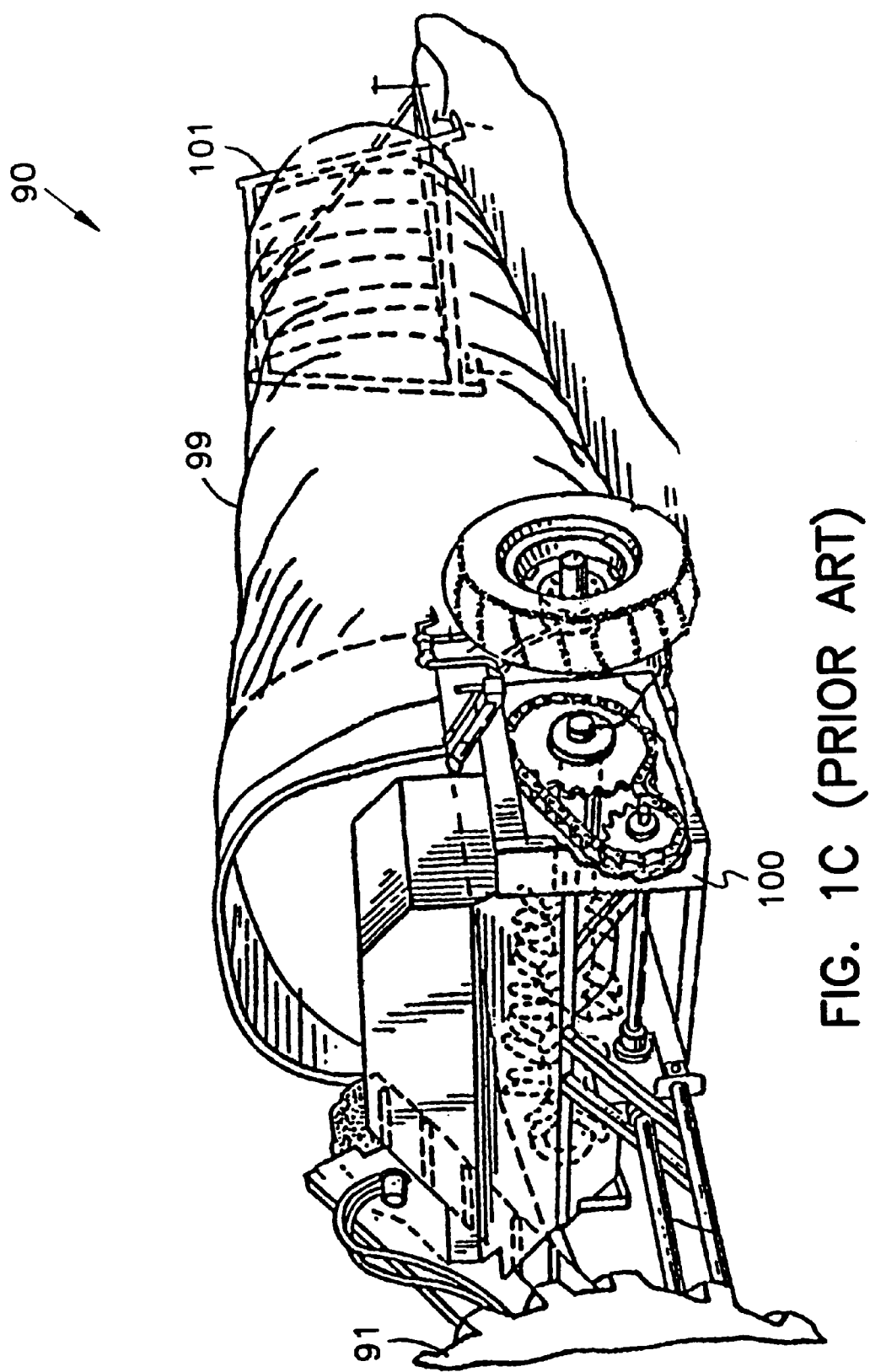
FIG. 1C is a front perspective view, showing bag 99 being filled, of a prior-art feed-bagging machine 100.
Figure 1D:
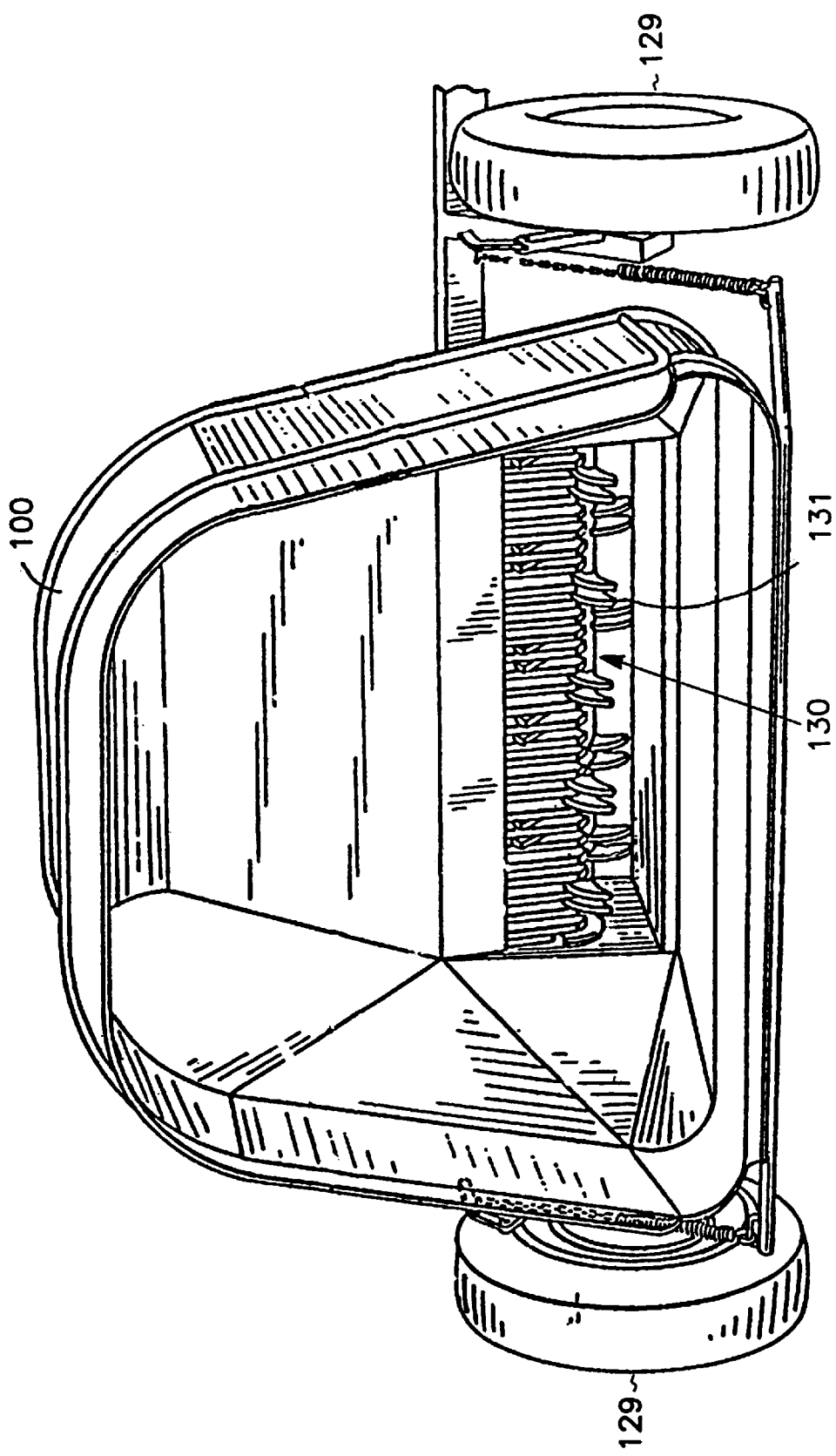
FIG. 1D is a back perspective view of a prior-art feed-bagging machine 100.

1. Feed does not flow smoothly into the feedstock storage bag 99. The uneven movement of feed into the bag results in air inclusions in the feedstock and bulging of various parts of bag 99 where the compaction pressure is too great. Air in the feedstock results in the oxidation of more feed, resulting in less feed value to the stored crop.
2. Uneven and lumpy feeding of the feedstock into the storage bag results in less feed stored in the bag, since the storage space is not fully utilized. (The sections of the feed with lower compaction do not fully utilize the bag capacity.)
3. Conventional baggers leave the filled bags with an oval-like shape 89, with a flattened bottom (see FIG. 1E). FIG. 1E is a cross-section view of section 1E—1E from FIG. 1B showing the general oval-like shape 89 of bag 99 after the bag 99 has being filled and passed beyond tunnel 150, (with a flat bottom against the ground, but which collapses more over time to shape 89'). This oval shape 89 lacks a wide stable footprint or base for the feed 98 to rest on. Gravity acts on the feed causing the feed to sag at the lower edges to shape 89'. The oval shape 89 or 89' are not consistent with the shape of modem machinery scoops (i.e., front-end loader buckets) used to empty the feed from the bag 99.

Benefits of improved bagger design of the present invention
1. Uniform compression of feed 98 as it enters the storage bag 99 (after tunnel 250) resulting in greatly reduced air inclusion in feedstock resulting in better feed quality and value.
2. Uniform compression and air exclusion from the feedstock results in more tons of feed stored in each storage bag 99.
3. A flared wider base is initially imparted to the filled bag 99 due to the shaping of the feed mass as it is shaped by the improved tunnel design. This wide base design is a more stable storage stack shape. The wider base is a shape more suited to feed removal with modern machinery feed scoops.

4. Uniform planned correct circumferential tension on the feed container bag 99 as it leaves the bagger 200 and accepts the feedstock 98. The result is more feed capacity per lineal foot of bag material.

The benefits described above are the intended results and observed benefits of the herein contained bagger modifications.

Improved Silage Bagger 200 and Bagging Mechanics
Modified Bagger Tunnel 250

The bagger tunnel 250 is modified in a manner which causes the feedstock to form a compact, smooth, uniformly compressed, and stabilized feed pack to enter the feed storage bag 99. Previous bagger tunnels are not designed to prevent rolling and boiling of feedstock as it enters the feed storage bag 99 after leaving e.g., tunnel 150. The result was variable feed compression and air inclusion in the feed mass. Air is detrimental to the feed preservation process.

In one embodiment, bagger tunnel 250 is also redesigned with an expanded, and smooth outer surface, without external pipes or other reinforcing structures. This shape and surface characteristics, along with increased bagger ground clearance, puts a planned tension on the feed container bag so that it leaves the bag holder 125 and lower bag tray 220 and accepts the feed 89 in a planned properly tensioned condition. This condition allows for more feed storage per lineal foot of bag 99, and helps reduce the amount of included air in the feedstock mass resulting in better feed preservation. In one embodiment, the hanging brackets on the front edge of tray 220 include multiple vertically spaced pins 222 to allow various height adjustments relative to bracket 121.

In one embodiment, wheels 129 (which in one conventional machine are 15-inch radius wheels and tires) are replaced with larger wheels 229 (which in one embodiment are 20-inch diameter wheels and tires), which effectively raises machine 200 by five inches, providing increased ground clearance, more space to load the folded bag 99 onto lower tray 220, and increased stretching of bag 99 between tunnel 250 and the ground 90.

The bagger tunnel 250 is shaped to leave the filled bag standing with a flat bottom and near vertical sides shape 289 (see FIG. 2E). This shape 289 tends to change less over time from the effect of gravity and bag stretch, than does a rounded filled shape 89 (see FIG. 1E), which tends to sag to shape 89' over weeks of storage.

In one embodiment, the new tunnel design uses a conventional bagger 100, but removes the original bagger tunnel 150. The modified tunnel 250 is welded to the bagger output frame. The top of the tunnel is the same height as the original frame. The improved tunnel shape is nine inches wider at the lower outer corners of the original bagger frame. This has been proven to be the required increase in space required to properly shape the feed mass as it leaves the feedstock input cylinder. In one embodiment, the improved tunnel 250 is five feet in length. This has proven to be the length needed to stabilize the feedstock mass as it enters the plastic container bag. In one embodiment, bagger tunnel 250 tapers inward 1.5 inches at the bottom outer comers at each rear side from the widest point 251 to the widest point 254 at the rear of tunnel 250. This slight taper has been proven to be very helpful, or perhaps necessary, to properly smooth and compress the feedstock mass as it enters the feed storage bag 99. See Appendix Sketch A for illustration of shape and dimensions.

Modified Bag Tray 220 Position

Conventional bag trays 120 does not release the bag in a uniform manner, the result is wasted bag capacity and air pockets. Having the upper surface of the folded, undeployed bag in a substantially horizontal position as shown in FIG. 1B seems to cause much of this problem. The improved bag holder 220 positioning allows the weight of feed 89 in the bag 99, as well as the inclined angle away from the direction the bag is unfolding to add tension to the releasing draft on the bag so that it leaves smoothly and under adequate tension to keep the bag smooth and wrinkle-free to the feed application point. The modified bag tray 220 is lowered in front by lengthening the front support brackets (in one embodiment, several cross-members are welded at various locations along this increased length to allow the user to select the proper amount of inclination of lower bag tray 220. Larger 20-inch wheels and tires (which replace the 15-inch-diameter wheels that initially come with one type of conventional machine 100 that is modified to bagger machine 200 of the present invention) are required in order to increase ground clearance for the entire machine 200 and the lowered/inclined lower bag tray 220. The raised machine 200 also allows for easier installation of the new bags to the machine bag holder. See Appendix photograph 12 for detail of part location.

Accessory Box

The modified backstop-supporting brackets are larger and removable, requiring a storage place. The metal box is added to the machine to provide a safe and dependable storage site for these parts. See Appendix photograph 1 for location and visual of the parts box.

Modified Backstop Transport Brackets

The backstop needs brackets to hold it during transport from location to location. The modified feed tunnel has newly designed transport brackets. See Appendix photograph 8, arrow a, for visual of transport bracket.

Modified Backstop Lift Arm

The longer feed tunnel requires a modification to the position of the lift arm. The lift arm is moved to the outside of the machine. The inner tube of the lift arm is lengthened to give the lift arm the reach needed to reach the center of the backstop from its new position on the bagger frame. See Appendix photograph 8, arrow b and arrow c for modification to lift arm.

Modified Backstop Lift Arm Position

The lift arm is repositioned further out on the machine to allow for the widening of the feed control tunnel. See Appendix photograph 8 for illustration of new position.

Backstop Modification

The modified bagger 200 produces a wider finished product than the original machine 100. The backstop 201 must be made wider than backstop 101 to allow the brake cables to clear the bag sides and the wider double-tapered tunnel 250. The backstops 201 for each width machine are widened to allow for the proper cable-to-bag clearance.

Backstop Modification for the Nine-Foot Bagger

The backstop 201 for the nine-foot bagger must be widened by one foot and the backstop must be reinforced with a pipe bridging to prevent it from bending. By adding a pipe bridge reinforcement, the lower beam of the nine-foot backstop is strengthened to take the pressure of the braking force against the feed storage bag. See Appendix Photographs 9, 10 and 11 for exhibit of modified backstop.

Backstop Transportation Support Brackets

Removable backstop support brackets are designed and positioned to the back edge of the modified feed control tunnel. See Appendix photograph 5 for location and view of modified support brackets.

Summary

The main purpose of this effort is to patent the modifications that contribute to the improved bagger product. Those design-modifying features that result in the improved product are:

1. The enlarged space in the bagger tunnel as the feedstock leaves the feed-stuffing cylinder and enters the bagger tunnel, nine inches added to the bottom sides at the front edge of the bagging tunnel.
2. The long slightly narrowing five-foot bagger tunnel. This length is needed to contain the feed and mold the shape as before it leaves the bagger.
3. The increased ground clearance from using 20-inch wheels which change the bag-to-machine tension as it is pulled over the bagger tunnel. The added tension to the bag in the bag-carrying platform caused by lowering the front of the bag tray, allowed by the greater ground clearance. This added tension provides for smoother feeding of the bag to the bagger tunnel surface.
4. The smooth and shaped shoulders of the bagger tunnel along with the increased ground clearance which properly tension and stretch the bag as it accepts the feedstock from the bagger tunnel.
5. The wider base to the feed tunnel shape which molds the feedstock to enter the feed bag with a wider, flatter bottom to the finished product. Photos of the improved bagger 200 are attached in Appendix A.

The attached Appendix shows copies of 36 photographs of bagging machine 200 and prior-art bagging machine 100.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An improved agricultural feed stock loading apparatus for extruding feed into a horizontally deployed bag, comprising:
    a feed tunnel having forward and rearward ends, the tunnel further having at least a top wall extending between opposite side walls defining a bag opening having a bottom portion extending between the opposite side walls, such that the bag may be placed around the tunnel to be deployed toward the rearward end of the tunnel around the defined bag opening, and the tunnel includes a double taper such that the feed is compacted from the forward end toward the rearward end within the tunnel and a cross-sectional circumference of the feed reduces as the feed moves through the tunnel, and wherein the circumference of the feed in the tunnel starts to reduce at a location along the tunnel closer to the forward end of the tunnel than to the rearward end of the tunnel;
    a hopper disposed adjacent the tunnel forward end and communicating with the tunnel through a feed opening oriented in a wall defining the forward end of the tunnel;
    a rotor element for propelling feed stock from the hopper though the feed opening into the tunnel and a secured bag, the rotor element having a rotor rotatable about a horizontal axis.

2. The apparatus of claim 1, wherein the tunnel has sufficient length such that feed compaction occurs substantially only within the tunnel.

3. The apparatus of claim 1, wherein the tunnel is about five feet in length.

4. The apparatus of claim 3, wherein the tunnel increases in width about nine inches for the double taper.

5. The apparatus of claim 1, wherein the tunnel double taper is comprised of segmented substantially flat tapered panels that increase the tunnel in width at a rate that is greatest below a midpoint in height of the tunnel.

6. The apparatus of claim 1, further comprising:
    a feed-distributing auger disposed across a feed input opening of the hopper to distribute feed substantially evenly across the hopper.

7. The apparatus of claim 1, wherein the feed-distributing auger includes a screw portion that moves feed longitudinally along the feed-distributing auger and a flapper portion that distributes the feed in a lateral direction from the auger.

8. The apparatus of claim 1, wherein the tunnel is formed to have a smooth outer surface without external pipes.

9. The apparatus of claim 1, wherein the tunnel is formed to have a smooth outer surface without added reinforcing structures.

10. The apparatus of claim 1, further comprising:
    a bag lift arm mounted closer to an outer side than a center of the apparatus, and of sufficient length to give the lift arm the reach needed to reach the center of the rearward end of the tunnel from its side position.

11. The apparatus of claim 1, further comprising:
    backstop support brackets positioned to the rearward end of the tunnel.

12. An improved method for loading agricultural feed stock into a horizontally deployed bag comprising:
    mounting the bag around a forward end of a tunnel;
    deploying the bag from the forward end of the tunnel towards a rearward end of the tunnel;
    stretching the bag circumferentially with the tunnel between the forward and rearward ends, and then reducing in circumference the bag;
    compacting feed, from the tunnel forward end, into the tunnel between the forward and rearward ends, and reducing in circumference the feed as the feed passes towards the rearward end of the tunnel; and
    allowing the feed to extrude from the rearward end of the tunnel into the bag.

13. The method of claim 12, wherein the stretching the bag circumferentially with the tunnel includes stretching the circumference of the bag using the feed at a bottom portion to stretch the bag.

14. The method of claim 12, wherein the compacting feed occurs substantially only within the tunnel.

15. The method of claim 12, wherein the compacting feed occurs substantially only before the feed leaves the tunnel.

16. The method of claim 12, wherein the tunnel has a double taper that is defined by segmented substantially flat tapered panels that increase the tunnel in width at a rate that is greatest below a midpoint in height of the tunnel.

17. The method according to claim 12, further comprising:
    distributing feed across a feed input opening of an input hopper to distribute feed substantially evenly across the hopper, wherein the step of distributing includes:
        screwing the feed to move feed longitudinally along a feed-distributing auger, and
        flapping the feed to distribute the feed in a lateral direction from the auger.

18. An improved agricultural feed stock loading apparatus for extruding feed into a secured horizontally deployed bag, comprising:
    means for compacting and extruding the feed such that the feed is substantially uniformly compressed after leaving the means for compacting and extruding, the means for compacting and extruding having forward and rearward ends;

a hopper disposed adjacent the forward end of the means for compacting and extruding and communicating with the means for compacting and extruding through a feed opening oriented in a wall defining the forward end of the means for compacting and extruding; and a rotor element for propelling feed stock from the hopper though the feed opening into the means for compacting and extruding and the secured bag, the rotor element having a rotor rotatable about a horizontal axis.

19. The apparatus of claim 18, wherein the means for compacting and extruding has sufficient length such that feed compaction occurs substantially only within the means for compacting and extruding.

20. The apparatus of claim 18, wherein the means for compacting and extruding is formed to have a smooth outer surface without added reinforcing structures.

\* \* \* \* \*